(12) United States Patent
Noguchi

(10) Patent No.: US 6,515,762 B2
(45) Date of Patent: *Feb. 4, 2003

(54) IMAGE PROCESSING AND METHOD, AND STORAGE MEDIUM

(75) Inventor: Yasutaka Noguchi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 354 days.

(21) Appl. No.: 09/119,049

(22) Filed: Jul. 20, 1998

(65) Prior Publication Data

US 2001/0043343 A1 Nov. 22, 2001

(30) Foreign Application Priority Data

Jul. 23, 1997 (JP) .............................................. 9-197017
Jun. 26, 1998 (JP) ............................................ 10-179952

(51) Int. Cl.⁷ ............................ G06K 15/02; H04N 1/44
(52) U.S. Cl. ........................ 358/1.9; 358/1.15; 358/1.18
(58) Field of Search ................................ 382/112, 100; 399/366; 283/901, 902, 72, 73, 93, 113, 114; 358/438, 440, 1.9, 1.15, 1.18, 401, 443

(56) References Cited

U.S. PATENT DOCUMENTS

| 4,270,146 | A | * | 5/1981 | Adachi | 358/450 |
|---|---|---|---|---|---|
| 4,924,328 | A | * | 5/1990 | Endoh et al. | 368/60 |
| 5,465,161 | A | * | 11/1995 | Funada et al. | 358/438 |
| 5,481,377 | A | * | 1/1996 | Udagawa et al. | 358/501 |
| 5,661,574 | A | * | 8/1997 | Kawana | 358/501 |
| 5,696,594 | A | * | 12/1997 | Saito et al. | 358/296 |
| 6,021,255 | A | * | 2/2000 | Hayashi et al. | 358/1.9 |

FOREIGN PATENT DOCUMENTS

EP          0 637 165 A1  *  2/1995  ............ H04N/1/00

* cited by examiner

Primary Examiner—Scott Rogers
(74) Attorney, Agent, or Firm—Fitzpatrick, Cella, Harper & Scinto

(57) ABSTRACT

This invention has as its object to reliably and efficiently add additional information to an input image even when a system for performing image processing of the input image may include a plurality of equipments having a function of adding additional information. In order to achieve this object, according to this invention, an image processing apparatus has generation means for generating image data, discrimination means for discriminating whether or not an externally connected equipment related to the image data generated by the generation means adds predetermined additional information to be hardly discernible by the human eye, adding means for adding the predetermined additional information to the image data generated by the generation means to be hardly discernible by the human eye in accordance with the discrimination result of the discrimination means, and output means for outputting the image data to which the predetermined additional information is added by the adding means or the image data generated by the generation means.

21 Claims, 11 Drawing Sheets

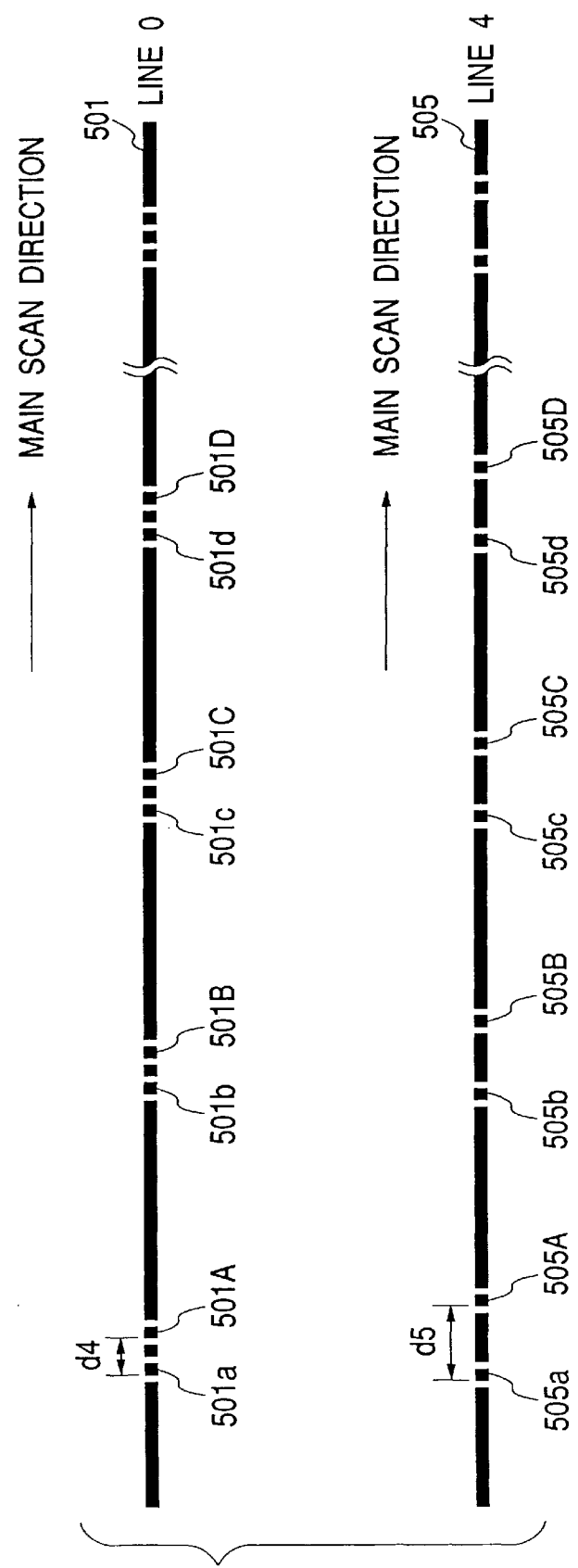

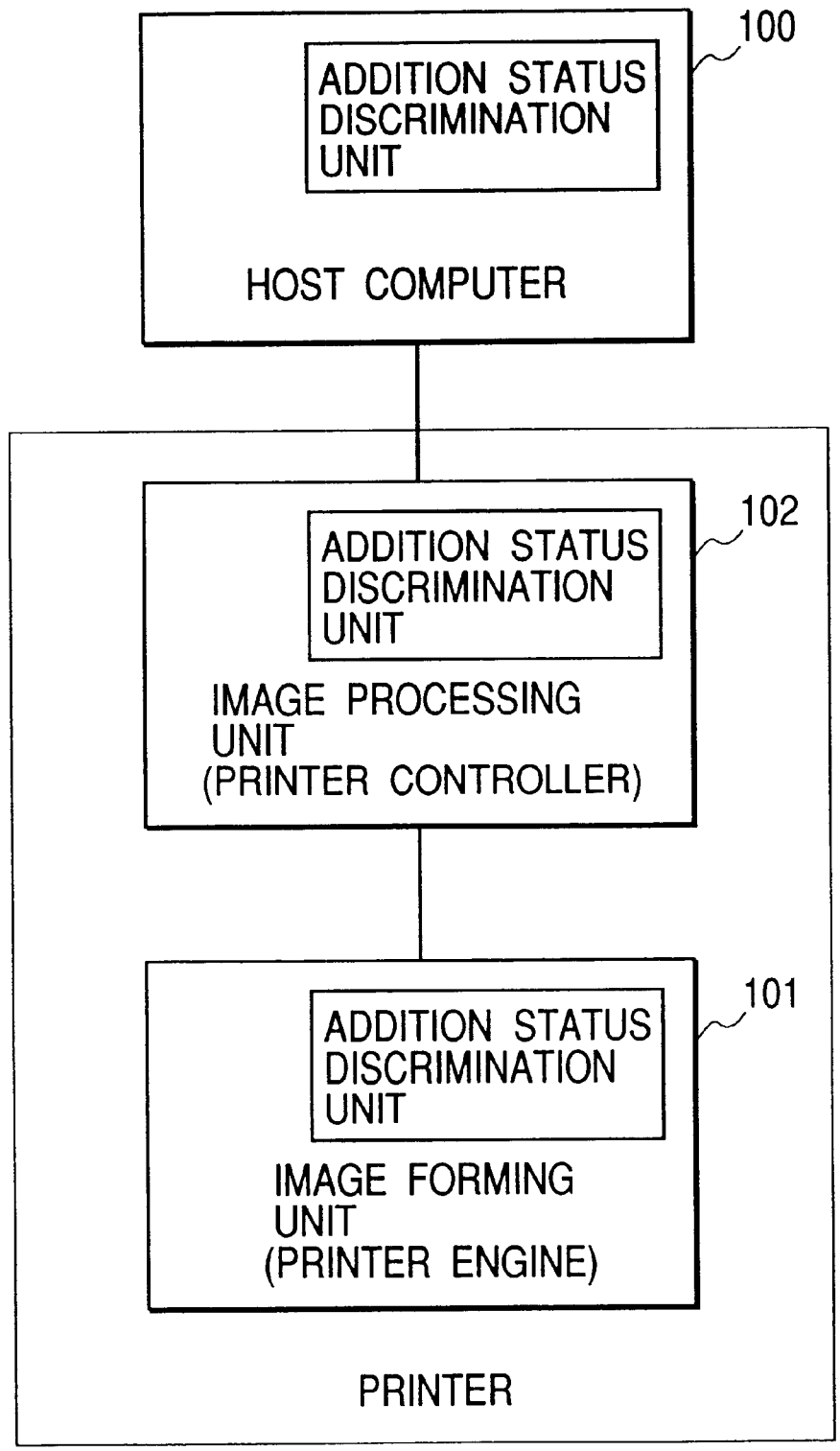

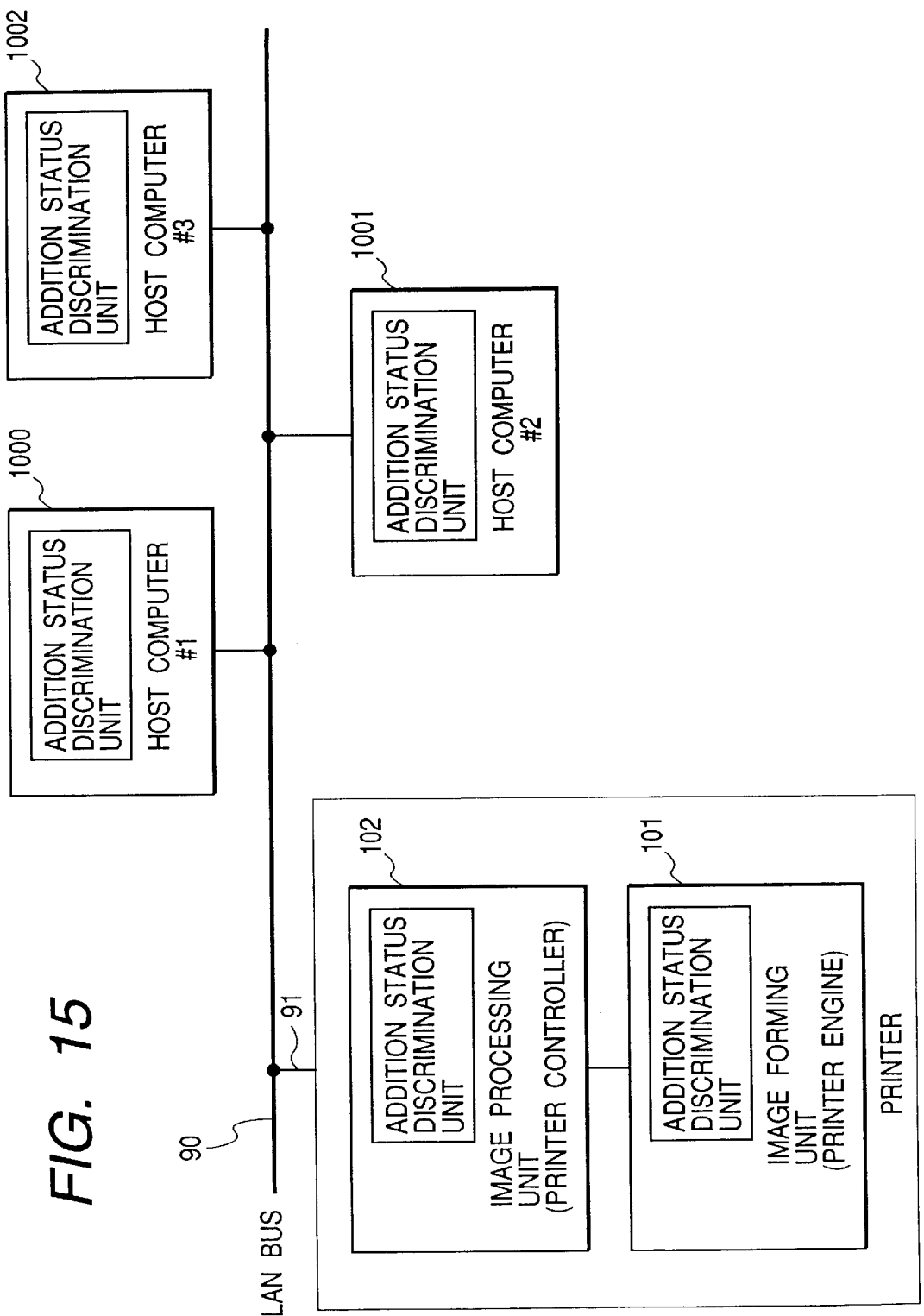

IMAGE PROCESSING AND METHOD, AND STORAGE MEDIUM

BACKGROUND OF THE INVENTION

1. Field of the Invention

The present invention relates to an image processing apparatus and method, which can add additional information to an input image, and a storage medium which stores the method.

2. Related Background Art

FIG. 8 is a block diagram showing a conventional image processing unit 102 and image forming unit 101, which can execute color printing.

In FIG. 8, a CPU 5 controls the operations and operation timings of the respective units included in the image processing unit 102.

A host interface unit 1 interfaces various data communications between the image processing unit 102, and a host computer 100 as external equipment, and has an output buffer for temporarily storing data to be transmitted to the host computer 100, and an input buffer for temporarily holding data received from the host computer 100.

The host interface unit 1 not only exchanges various data with the host computer 100 but also controls communications with the host computer 100.

Hence, various data must be exchanged between the image processing unit 102 or image forming unit 101 and the host computer 100 via the host interface unit 1.

A communication line 2 connects the image processing unit 102 and host computer 100.

When image data (code data which contains character codes, graphic formation information, and control information and described in a predetermined description format) to be subjected to image processing or image formation is input from the host computer 100 to the image processing unit 102, the input image data is stored in a page memory 3 as code data.

The page memory 3 has a capacity capable of storing code data for at least one page of image, and stores code data containing character codes, graphic formation information, and control information for an image of each page in the reception order via the host interface unit 1.

A font memory 4 stores character pattern data corresponding to character codes. A program ROM 8 stores an image mapping program (a program for interpreting and mapping code data of character codes and graphic formation information to image data that can be processed by the image forming unit 101).

Hence, the character code in the code data which is received from the host computer 100 and stored in the page memory 3 is converted into bit pattern data using the data in the font memory 4 and image mapping program, and the graphic formation information in the code data is also converted into bit pattern data using the image mapping program. These converted bit pattern data are mapped as image data for printing on an image memory 6 (to be described later) in units of pages, respectively.

Note that the program ROM 8 also stores a control program required for controlling the entire image processing unit, and the CPU 5 controls the entire apparatus in accordance with that control program.

A random access memory (RAM) 7 is used as a work area used by the CPU 5 when it reads/writes various temporary data used upon executing processing using the control program.

The image memory 6 stores the bit pattern data generated by the image mapping program stored in the program ROM 8 as image data, and can store image data for at least one page of image in correspondence with the code data stored in the page memory 3.

The generation sequence of image data will be described in detail below. The CPU 5 interprets the character code, graphic formation information, and control information stored in the page memory 3 on the basis of the image mapping program stored in the program ROM 8 to generate various kinds of object information. Parallel to generation of such object information, the CPU 5 executes rasterization and pseudo gradation processing in turn.

In the rasterization, the CPU 5 converts R, G, and B (additive color mixing) as display color data contained in the graphic formation information into Y, M, C, and K (subtractive color mixing) that can be processed by the image forming unit 101, converts each character code into pre-stored font data such as bit pattern data, outline font data, or the like, and so forth to generate bitmap data. Also, the CPU 5 performs the pseudo gradation processing for the generated bitmap data to generate image data that can be processed by the image forming unit 101.

Note that the image data is binary or n-valued image data corresponding to the image forming unit 101.

A FIFO (First In First Out) memory 9 receives image data from the image memory 6, and outputs it to an image forming unit's interface unit 10. Image data output from the FIFO memory 9 is output as a video signal to the image forming unit 101 via the image forming unit's interface unit 10.

The image forming unit's interface unit 10 has an output buffer for temporarily holding a video signal to be output to the image forming unit 101 and a communication signal (command and the like) used in communications with the image forming unit 101, and an input buffer for temporarily holding a signal sent from the image forming unit 101. The image forming unit's interface unit 10 not only exchanges signals with the image forming unit 101 but also controls communications with the image forming unit 101.

A communication line 11 is used in data exchange between the image processing unit 102 and the image forming unit 101 shown in the block diagram in FIG. 8.

An operation panel 13 is comprised of command input means such as a keyboard, and the like, and a display device such as a CRT display and the like. With this command input means, the operator can make designation inputs for setting the operation environments of the respective units, e.g., setting the online/offline state of the host interface unit 1, and the like. With the display device, the operator can monitor the operation state (e.g., printing is ready or not, and so forth) of the image forming unit 101, and the operation state (mapping of code data is in progress, and so forth) of the image processing unit 102.

A command signal input from the operation panel 13 is supplied onto a data bus 14 and address bus 15 via an operation panel's interface unit 12, and an image signal to be displayed on the display device is output to the operation panel 13 via the operation panel's interface unit 12.

A clock signal 30 output from a clock generation circuit 16 is used as that for the CPU 5.

In recent years, image forming apparatuses such as color copying machines, color printers, and the like can form higher-quality color images and, hence, images with quality equivalent to those of bills, securities, and the like.

However, formation of such images is illegal. Therefore, a technique for inhibiting such images from being formed is known.

For example, additional information that specifies a given image forming apparatus or user can be embedded in all images formed by that image forming apparatus to be hardly perceivable or discernible by the human eye.

With such information, even when an image is illicitly formed, various situations upon forming this image can be detected by decoding the additional information in that formed image using a dedicated decoding apparatus.

Note that this additional information is embedded in the Y component alone of a color image made up of Y (yellow), M (magenta), C (cyan), and K (black) to conceal the presence of the additional information from the human eye.

In general, the final stage (that is, a printer engine) of the image forming processes adds additional information to an original image. Otherwise, there is only one equipment having a function of adding additional information in a system from when image data is generated until it is printed.

Conventionally, a system until generated image data is finally formed as a visible image includes only one equipment having a function of adding additional information.

Hence, when the system until the generated image data is finally formed as a visible image includes a plurality of equipments having a function of adding additional information, no optimal adding method of the additional information is available to date.

For example, when both the image processing unit (a printer controller in case of a printer) and the image forming unit (a printer engine in case of the printer) have the above-mentioned function of adding additional information, one of these units to add additional information must be selected, and its adding method must be set in advance.

On the other hand, when either of the image processing unit and image forming unit has a function of adding additional information, the unit which has the adding function must always add the additional information.

SUMMARY OF THE INVENTION

The present invention has been made in consideration of the aforementioned prior art, and has as its object to reliably and efficiently add additional information to an input image even when a system for performing image processing of the input image may include a plurality of equipments having a function of adding additional information.

In order to achieve the above object, according to one preferred embodiment of the present invention, there is provided an image processing apparatus comprising:

generation means for generating image data;

discrimination means for discriminating whether or not an externally connected equipment related to the image data generated by the generation means has a function of adding predetermined additional information to be hardly discernible by the human eye;

adding means for adding the predetermined additional information to the image data generated by the generation means to be hardly discernible by the human eye in accordance with a discrimination result of the discrimination means; and output means for outputting the image data to which the predetermined additional information is added by the adding means or the image data generated by the generation means.

There is also provided an image processing apparatus comprising:

generation means for generating image data;

discrimination means for discriminating whether or not an externally connected equipment related to the image data generated by the generation means adds predetermined additional information to be hardly discernible by the human eye;

adding means for adding the predetermined additional information to the image data generated by the generation means to be hardly discernible by the human eye in accordance with a discrimination result of the discrimination means; and output means for outputting the image data to which the predetermined additional information is added by the adding means or the image data generated by the generation means.

Other objects and features of the present invention will become apparent from the following description of the embodiments taken in conjunction with the accompanying drawings.

BRIEF DESCRIPTION OF THE DRAWINGS

FIG. 13 is a view showing an example of the method of expressing information using add-on lines;

FIG. 14 is a block diagram for explaining the fourth embodiment; and

FIG. 15 is a block diagram showing an example of the network arrangement that explains the fifth embodiment.

DETAILED DESCRIPTION OF THE PREFERRED EMBODIMENT

The first embodiment of the present invention will be described below. Note that this embodiment will exemplify a color laser beam printer using an electrophotography technique. However, the present invention is not limited to printers using other printing techniques such as an ink-jet printer, thermal transfer printer, and the like.

Also, the present invention is not limited to printers but can be applied to other apparatuses such as a copying machine, FAX, and the like. Furthermore, the present invention is applied to a personal computer and the like as long as they can execute image processing.

Figure 8:
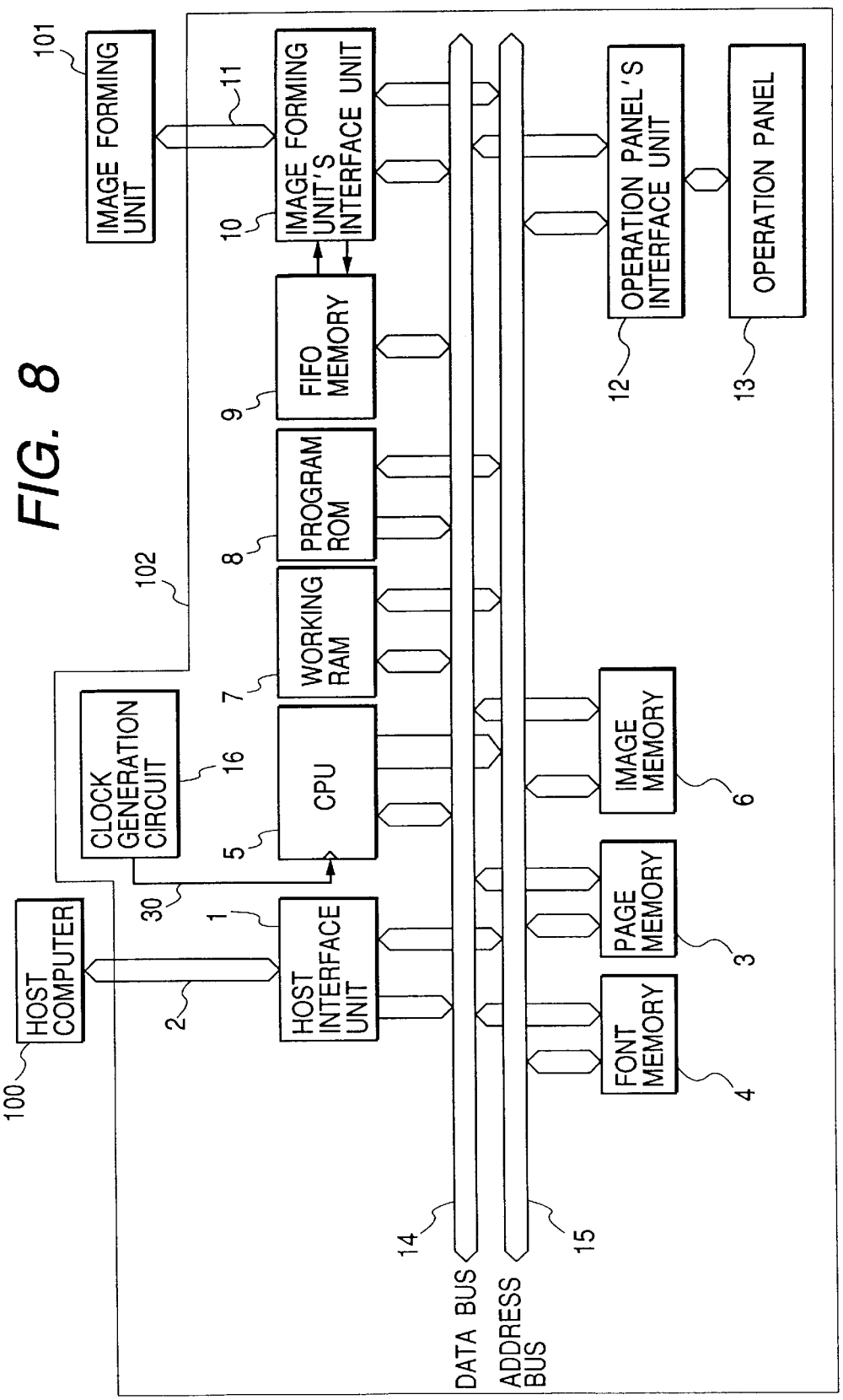
FIG. 8 is a block diagram showing the hardware arrangement of a conventional image processing unit.

Assume that in this embodiment the image processing unit 102 shown in FIG. 8 has a function of adding additional information. Since addition of additional information is implemented by the CPU 5 using a dedicated program stored in the program ROM 8, the block arrangement is the same as that shown in FIG. 8.

Note that the additional information in this embodiment includes the manufacturer ID of the manufacturer who manufactured the image forming apparatus, factory ID, model number, machine number, user ID, and the like, and is added to mapped image data for each page to be hardly perceivable by the human eye. Note that the method of adding the additional information is known to those who are skilled in the art but its example will be explained later.

Also, this image processing unit 102 has a function of inquiring of the image forming unit 101 as to whether or not it has the above-mentioned function, i.e., the function of adding additional information, before color image data (image data) mapped from code data is output to the image forming unit 101. The CPU 5 performs communication control for such inquiry function.

If a reply from the image forming unit 101 to that inquiry indicates that the image forming unit 101 has no function of adding additional information or has that function but does not add any additional information to the next color image data to be output, the image processing unit 102 adds additional information to the Y (yellow) component alone of the color image data to be output, and outputs the processed color image data to the image forming unit 101.

Upon receiving this color image data, the image forming unit 101 outputs that color image data onto a recording medium as a visible image without adding any additional information to the color image data.

Figure 1:
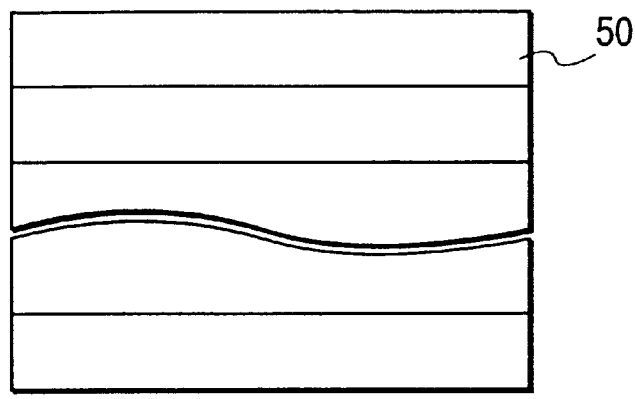
FIG. 1 shows a memory map allocated on a working RAM used in the first embodiment.
Figure 2:
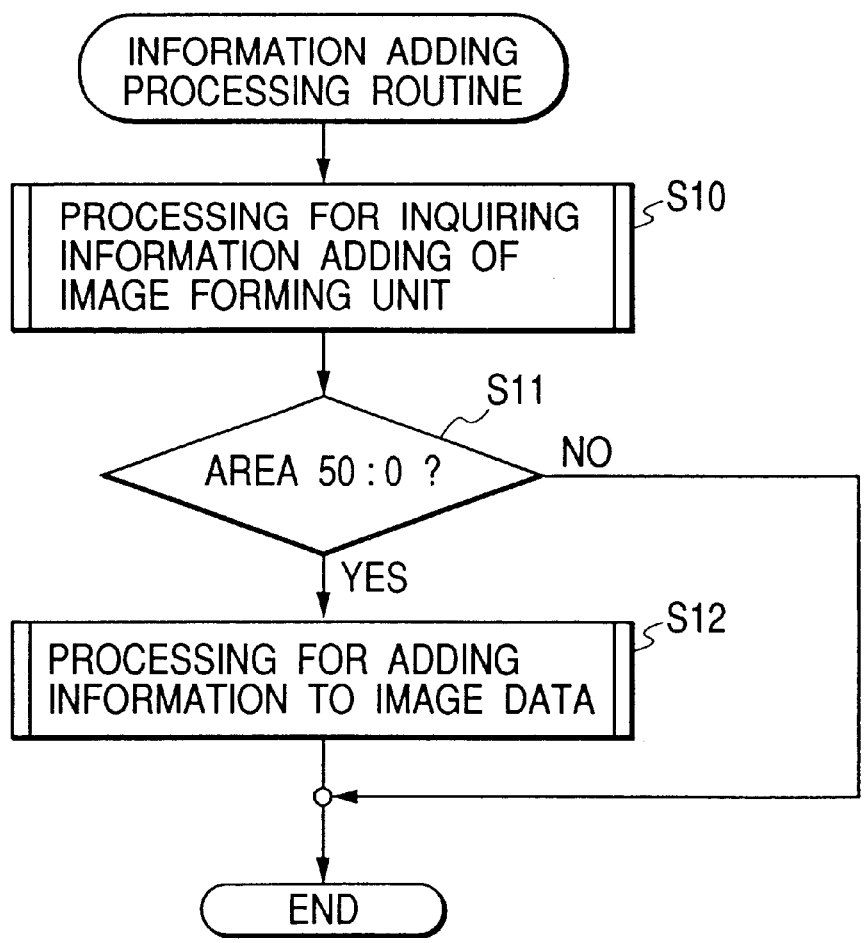
FIG. 2 is a flow chart showing the first embodiment.

FIG. 1 shows the memory map allocated on the working RAM 7 used by the CPU 5 shown in FIG. 8, and FIG. 2 is a flow chart showing the sequence for executing this embodiment.

Note that the sequence shown in FIG. 2 is controlled and executed by the CPU 5, and a program required for this sequence is stored in the program ROM 8 shown in FIG. 8.

An inquiry reply result setting area 50 in the memory map (FIG. 1) stores a reply result from the image forming unit 101, which result indicates whether or not the image forming unit 101 adds additional information to color image data to be output from the image processing unit 102.

More specifically, "1" is set in this area when the reply indicates that the image forming unit 101 adds the additional information; otherwise, "0" is set.

The flow chart in FIG. 2 will be explained below. In FIG. 2, when image data for one page is obtained by mapping code data input from the host computer 100, and the output timing of this image data to the image forming unit 101 is reached, an information adding processing routine starts.

In step S10, the image processing unit 102 inquires of the image forming unit 101 as to whether or not it adds additional information to image data (color image data) to be output.

If the image forming unit 101 sends back, in response to this inquiry, a reply indicating that it has no function of adding additional information or it has that function but does not add any additional information to the color image data to be output, or if the image forming unit 101 does not send back any reply, "0" is stored in the inquiry reply result setting area 50 on the working RAM 7; if the image forming unit 101 sends back a reply indicating that it adds additional information, "1" is stored in the inquiry reply result setting area 50 on the working RAM 7.

In step S11, the storage contents of the inquiry reply result setting area 50 are looked up, and if the storage contents are "0", the flow advances to step S12; if the contents are "1", this information adding processing routine ends.

In step S12, additional information (the manufacturer ID of the manufacturer who manufactured the image processing unit, factory ID, model number, machine number, user ID, and the like) that can specify the image processing unit is added to the image data (color image data) to be output to the image forming unit 101.

With the above-mentioned processing, since additional information is adaptively added depending on whether one or both the image processing unit 102 and image forming unit 101 has or have the function of adding additional information, additional information can be reliably and efficiently added.

Figure 3:
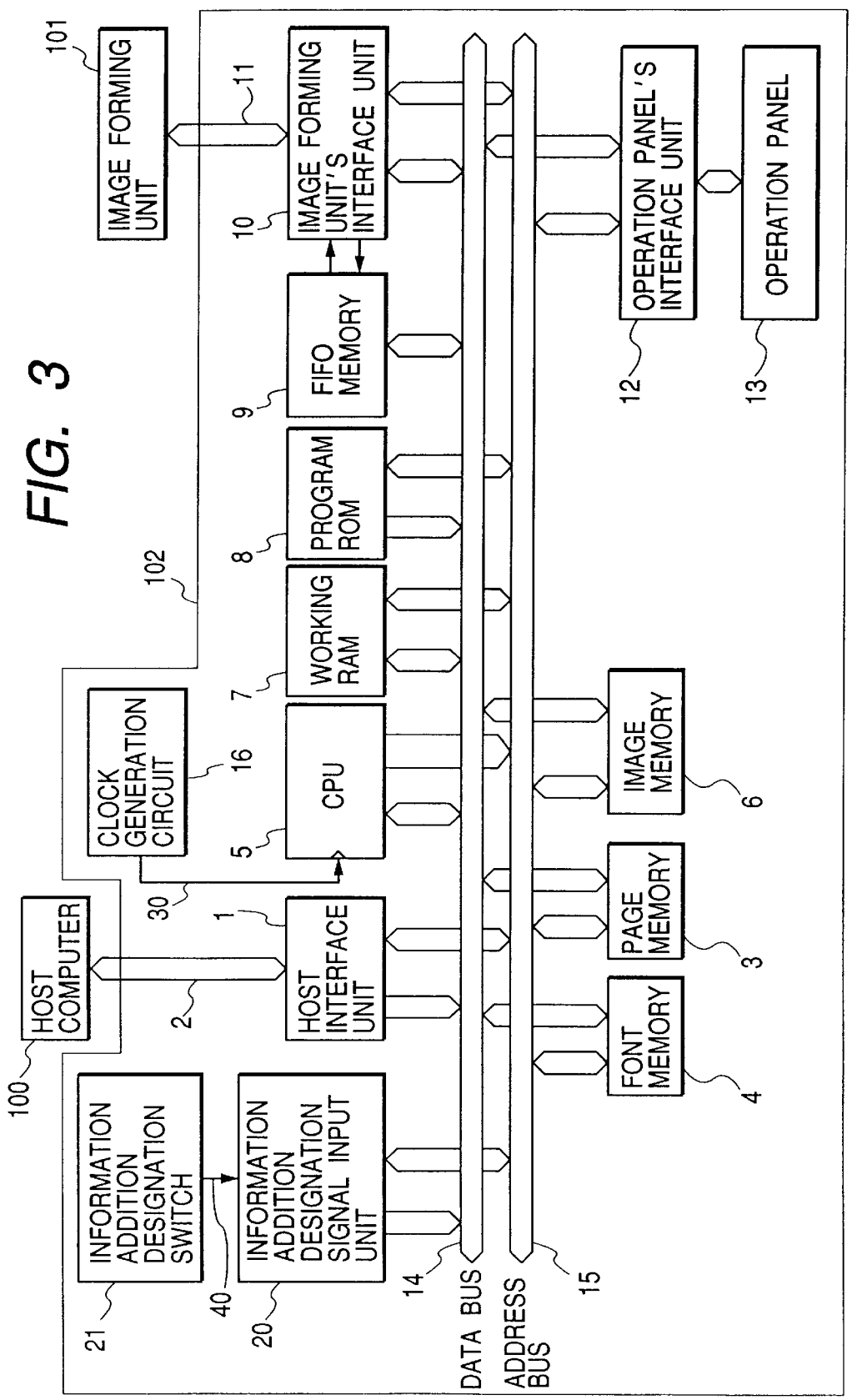
FIG. 3 is a block diagram showing the hardware arrangement that explains the second embodiment.

FIG. 3 which shows the image processing unit 103 according to the second embodiment of the present invention will be described in detail below.

The arrangement shown in FIG. 3 is substantially the same as that shown in FIG. 8 described above, except for an information adding designation signal input unit 20, information adding designation switch 21, and information adding designation signal 40.

The information adding designation signal 40 can store information (which is the same as that stored in the inquiry reply result setting area 50 in the first embodiment) as to whether or not the image forming unit 101 adds additional information to color image data to be output from the image processing unit 102 to the image forming unit 101, and designates whether or not the image processing unit 102 adds additional information to the color image data. Note that the information indicating whether or not the image forming unit 101 adds additional information is obtained from a reply from the image forming unit 101 as in the first embodiment, and the information adding designation switch 21 (to be described later) is switched in response to this reply.

Also, the present invention includes the case wherein the user intentionally sets the state of the information adding designation switch 21.

The information adding designation switch 21 is used for controlling the information adding designation signal 40. Once the switch state is set, the switch 21 holds the setup state until the switch state is changed (e.g., a toggle switch).

Upon setting the state of this switch, the information adding designation signal 40 is maintained either High or Low.

The information adding designation signal 40 controlled by the information adding designation switch 21 is input to the data bus 14 and address bus 15 via the information adding designation signal input unit 20.

When the information adding designation signal 40 is High, it sets that the image forming unit 101 does not add any additional information to color image data output from the image processing unit 102, and the image processing unit 102 is controlled to add additional information to that color image data.

On the other hand, when the information adding designation signal 40 is Low, it sets that the image forming unit 101 adds additional information to color image data output from the image processing unit 102, and the image processing unit 102 is controlled not to add any additional information to that color image data.

Figure 4:
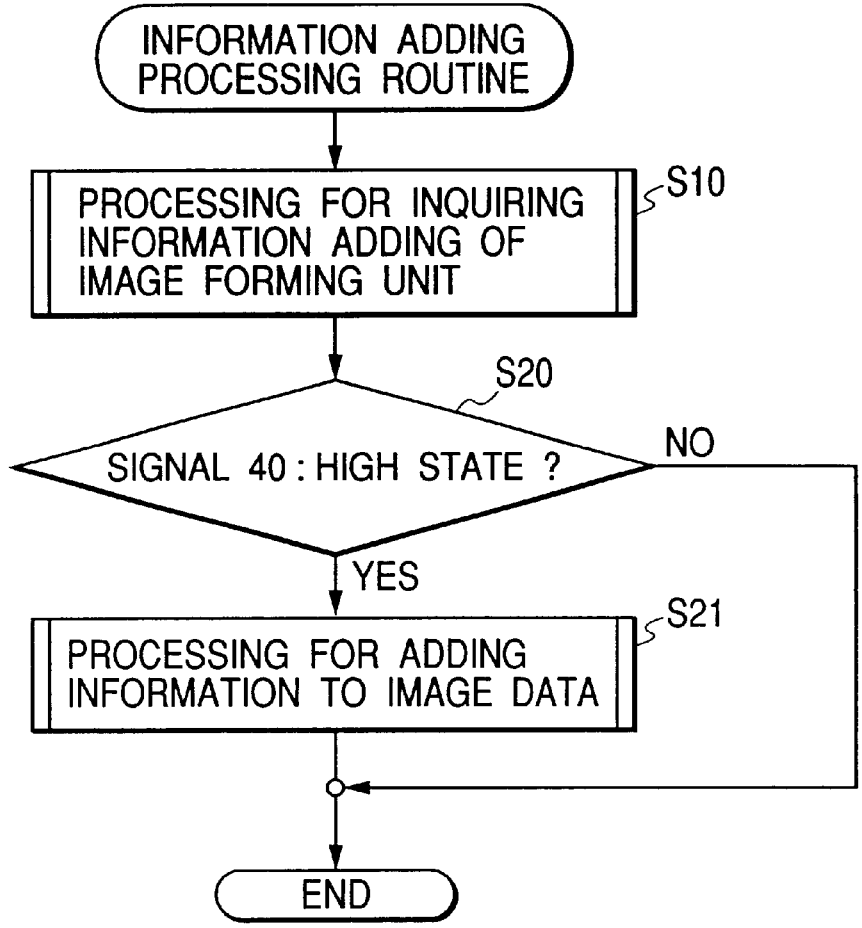
FIG. 4 is a flow chart showing the second embodiment.

FIG. 4 is a flow chart showing the sequence for executing the above-mentioned processing using the hardware arrangement shown in FIG. 3.

The sequence shown in FIG. 4 is controlled by the CPU 5 on the basis of a control program stored in the program ROM 8 shown in FIG. 3.

In FIG. 4, when image data for one page is obtained by mapping code data input from the host computer 100, and the output timing of this image data to the image forming unit 101 is reached, an information adding processing routine starts.

In step S10, the image processing unit 102 inquires of the image forming unit 101 as to whether or not it adds additional information to image data (color image data) to be output.

If the image forming unit 101 sends back, in response to this inquiry, a reply indicating that it has no function of adding additional information or it has that function but does not add any additional information to the color image data to be output, or if the image forming unit 101 does not send back any reply, the information adding designation switch 21 is switched to set the information adding designation signal 40 to High.

On the other hand, if the image forming unit 101 sends back a reply indicating that it adds additional information, the information adding designation switch 21 is switched to set the information adding designation signal 40 Low.

If it is then determined in step S20 that the information adding designation signal 40 is High, the flow advances to step S21; otherwise, the information adding processing routine ends.

In step S21, additional information (the manufacturer ID of the manufacturer who manufactured the image processing unit, factory ID, model number, machine number, user ID, and the like) that can specify the image processing unit is added to the image data (color image data) to be output to the image forming unit 101. Such additional information is stored in the information adding designation signal input unit 20 or program ROM 8, and is added by the CPU 5. The method of adding the information will be explained later. Note that this additional information cannot be rewritten by the user.

With the above-mentioned processing, since additional information is adaptively added depending on whether one or both the image processing unit 102 and image forming unit 101 has or have the function of adding additional information, additional information can be reliably and efficiently added.

The third embodiment of the present invention will be described below with reference to FIGS. 5 and 6. Note that the block arrangement required for this embodiment is the same as that in FIG. 8, and FIG. 8 will be used in the following description.

In this embodiment, the user can designate via the operation panel 13 whether or not the information processing unit 102 adds additional information, simultaneously with setup of information indicating whether or not the image forming unit 101 executes adding processing of additional information.

Figure 5:
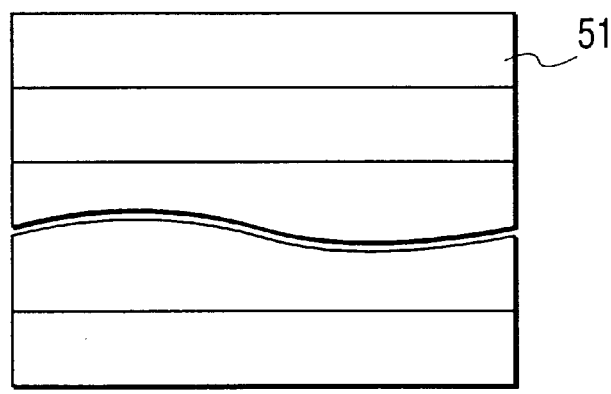
FIG. 5 shows a memory map allocated on a working RAM used in the third embodiment.
Figure 6:
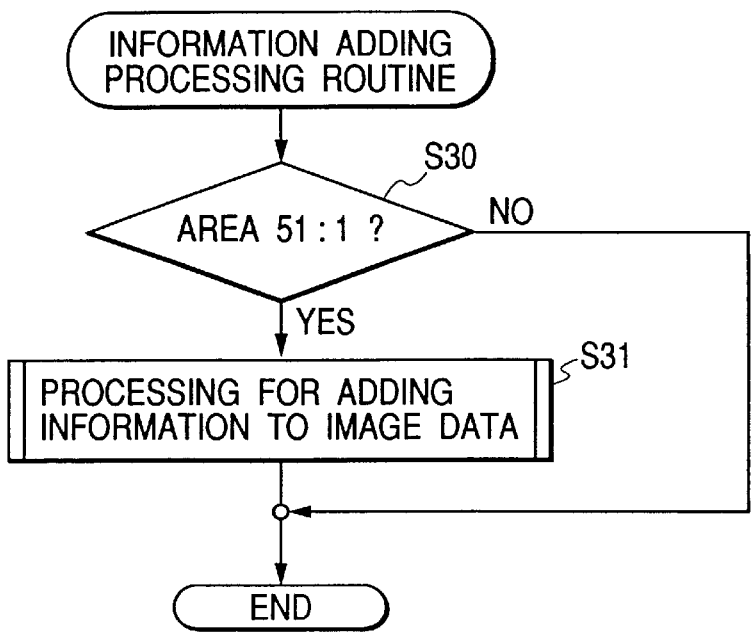
FIG. 6 is a flow chart showing the third embodiment.

FIG. 5 shows the memory map allocated on the working RAM 7 used by the CPU 5 shown in FIG. 8, and FIG. 6 is a flow chart showing the sequence for executing this embodiment.

Sequence control in FIG. 6 is executed by the CPU 5 using a control program stored in the program ROM 8 in FIG. 8.

Since the image forming unit 101 adds additional information on the basis of a command manually designated by the user, an information adding designation setting area 51 in the memory map shown in FIG. 5 stores "0" when the user designates not to add additional information by the image processing unit 102, or stores "1" when the user designates to add additional information by the image processing unit 102 since the image forming unit 101 does not execute adding processing of additional information.

The CPU 5 executes adding processing on the basis of information "1" or "0" based on the user's designation stored in the information adding designation setting area 51, and adds predetermined additional information by the image processing unit 102 when the stored information is "1".

This sequence will be explained below. In FIG. 6, when image data for one page is obtained by mapping code data input from the host computer 100, and the output timing of this image data to the image forming unit 101 is reached, an information adding processing routine starts.

If it is determined in step S30 that the storage contents in the information adding designation setting area 51 are "1", the flow advances to step S31; otherwise, the information adding processing routine ends.

In step S31, additional information (the manufacturer ID of the manufacturer who manufactured the image processing unit, factory ID, model number, machine number, user ID, and the like) that can specify the image processing unit is added to the image data (color image data) to be output to the image forming unit 101. Such additional information is stored in the program ROM 8, and is added by the CPU 5. The method of adding the information will be explained later. Note that this additional information cannot be rewritten by the user.

With the above-mentioned processing, since additional information is adaptively added depending on whether one or both the image processing unit 102 and image forming unit 101 has or have the function of adding additional information, additional information can be reliably and efficiently added.

Method of Adding Additional Information

A method of adding additional information to image data (color image data) will be described below. This method can be applied to the respective embodiments, and each embodiment uses this method unless otherwise specified.

A case will be explained below wherein two pieces of additional information are added to color image data.

Figure 7A:
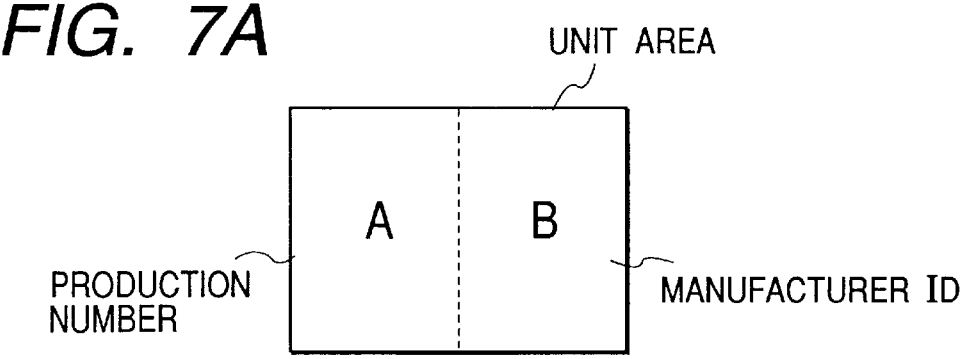
FIGS. 7A and 7B are conceptual views upon adding two pieces of information to color image data.
Figure 7B:
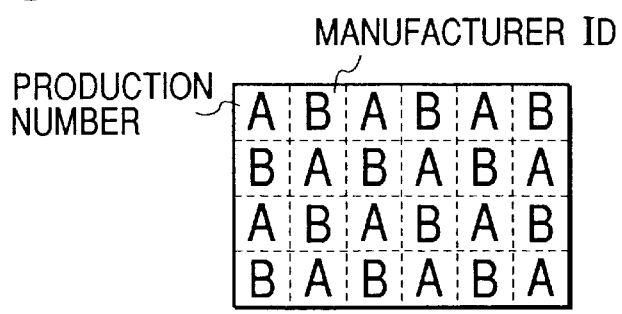

FIGS. 7A and 7B show an image for one page represented by color image data, which image is defined by an area A (an area to which the production number of the image processing unit 102 is added) and an area B (an area to which the ID of the manufacturer who manufactured the image processing unit 102 is added).

More specifically, a dot pattern representing the production number of the image processing unit 102 is embedded in the area A in a unit area. On the other hand, a dot pattern representing the ID of the manufacturer who manufactured the image processing unit 102 is embedded in the area B. Such dot patterns will be explained in detail later.

Note that the positional relationship of these two pieces of additional information to be added in one image may be appropriately designated as needed, and the areas A and B may be alternately arranged, as shown in FIGS. 7A and 7B.

An example of a technique for making such additional information invisible from the human eye will be described below.

Note that the processing executed when additional information is added to n-valued color image data will be explained below.

In each embodiment, input color image data consists of Y (yellow), M (magenta), C (cyan), and K (black) color components. The adding processing of additional processing is done not for all the color components but for some color components. In the following description, additional information is added to the Y component alone since Y of these color components is the least discernible by the human eye.

The arrangement of the above-mentioned dot pattern will be explained below.

In the following description, the dot pattern is formed by arranging a plurality of unit dots each consisting of a plurality of pixels at predetermined intervals, and can express information of several bits by the phase difference between neighboring unit dots.

Figure 9:
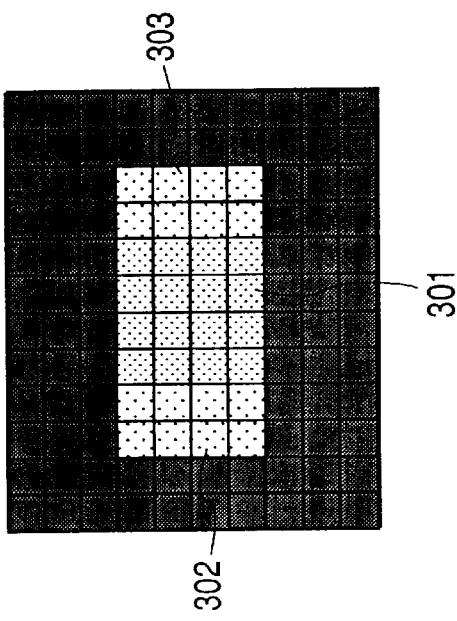
FIG. 9 is a view showing the method of generating an additional pattern used in information adding processing.

FIG. 9 shows the arrangement of a unit dot. A unit dot consists of a total of 32 pixels in areas 301, 302, and 303. In FIG. 9, 4×4 pixels in the area 301 correspond to an area to be modulated to increase the density of an original image (the yellow component of image data mapped by the image processing unit 102) by α. On the other hand, 16 pixels in the areas 302 and 303 (which are designed so that the number of pixels in the two areas equals that in the area 301) correspond to areas to be modulated to decrease the density of the original image (the yellow component of image data mapped by the image processing unit 102) by α. Note that the area around the unit dot is not density-modulated.

In the above-mentioned modulation, the practical density of an image is preserved before and after modulation.

In this way, since dots are embedded in the Y component and the density is preserved before and after the dots are embedded, the human eye can hardly perceive the embedded dots. However, these dots can be sufficiently decoded using a dedicated decoding apparatus.

Figure 10:
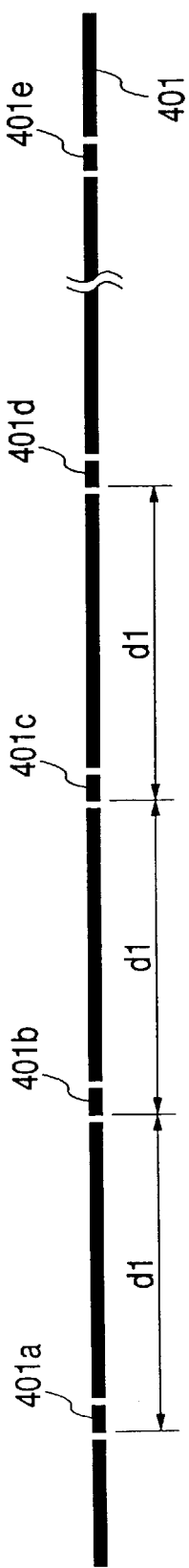
FIG. 10 is a view showing an example of an add-on line.
Figure 11:
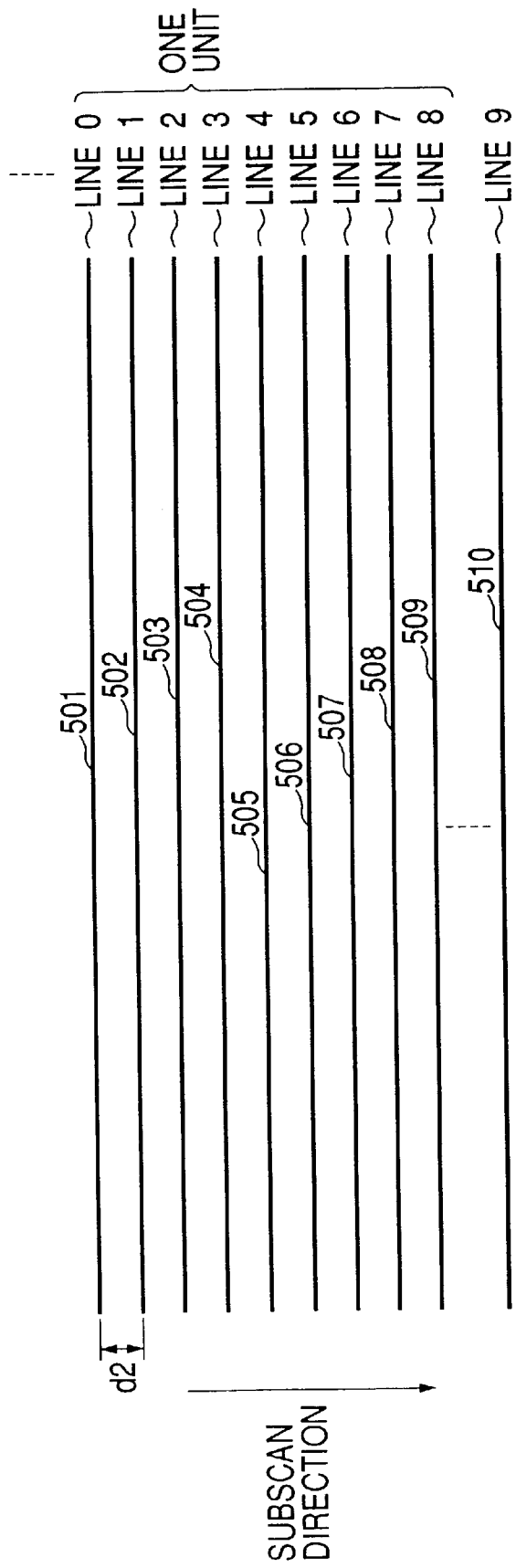
FIG. 11 is a view showing an example of a plurality of add-on lines.

FIGS. 10 and 11 are views for explaining the method of expressing additional information by arranging a plurality of unit dots.

In FIG. 10, an add-on line 401 is used for adding unit dots (this line has the same width (4 pixels) as that of the unit dot), and a plurality of add-on lines are present in an image.

Unit dots 401a to 401e are set on a single add-on line. These unit dots 401a to 401e are arranged at a given period dl (e.g., 128 pixels) in the main scan direction. In this description, information is not expressed by the phase difference between neighboring unit dots on the add-on line, but only operation for periodically embedding information is done.

In FIG. 11, add-on lines 501 to 510 are aligned at a predetermined period d2 (e.g., 16 pixels) in the subs can direction.

As will be described in detail later, 4-bit information can be expressed by the phase difference between unit dots on two add-on lines. When one unit dot pattern is defined by nine add-on lines 501 to 509 (the minimum number of lines required for completely expressing additional information), a total of 32-bit additional information (the manufacturer ID, production number or the like) can be expressed. More specifically, in this description, since combinations of eight add-on lines 501 to 508 are periodically embedded, unit dots on the add-on lines 501 and 509 are identical ones.

Note that this dot pattern for one unit is independently embedded in areas A and B shown in FIGS. 7A and 7B. That is, in FIGS. 7A and 7B, information of 64 bits (=32+32) is embedded in one frame.

Figure 12:
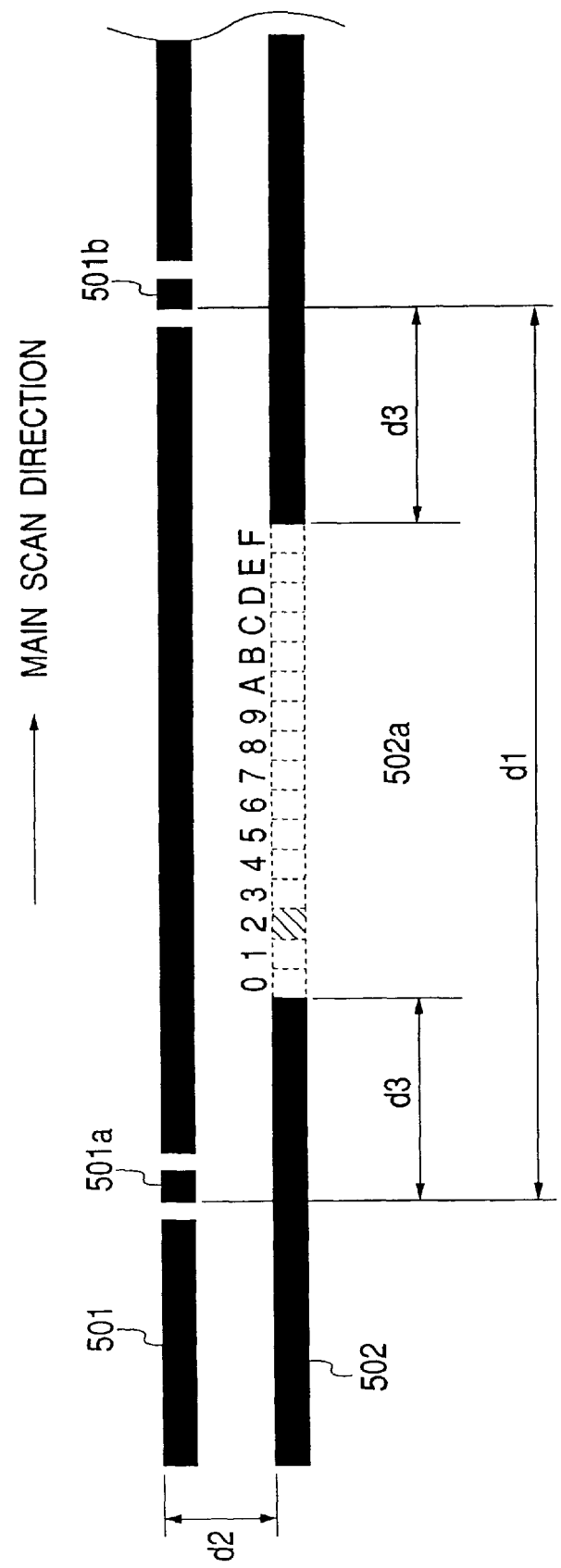
FIG. 12 is a view showing an example of the method of expressing information using add-on lines.

FIGS. 12 and 13 are views for explaining how to express 4-bit information by unit dots on add-on lines.

In FIG. 12, add-on lines 501 and 502 neighbor each other in FIG. 11. Unit dots 501a and 501b on the upper line and a unit dot 502a on the lower line are separated from each other by at least a spacing d3 (e.g., 32 pixels) in the main scan direction to prevent unit dots from becoming conspicuous to the human eye when unit dots on the upper and lower add-on lines are set to be close to each other in the main scan direction (when the unit dots are vertically juxtaposed).

The phase difference between the unit dots 501a and 502a can be decoded, as shown in FIG. 12. Since the unit dot 502a is added at a position corresponding to "2" of the phase differences which correspond to "0" to "F" with respect to the unit dot 501a, these two add-on lines can express "2", i.e., "0010" in binary notation.

FIG. 13 shows the state wherein a reference dot for specifying the head and order (vertical relationship) of add-on lines is added.

Add-on lines 501 and 505 in FIG. 13 are the same as those in FIG. 11. On the add-on line 501 (head line), dots 501A to 501D are added on the right side of all unit dots 501a to 501d of an additional pattern which represents the information to be added so as to be separated by a spacing d4 (e.g., 16 pixels) from each other. These dots indicate the head line.

Similarly, dots 505A to 505D are added on the right side of all unit dots 505a to 505d to be separated by a spacing d5 (e.g., 32 bits) from each other. These reference dots 505A to 505D can specify that this line is the fourth add-on line among nine lines. More specifically, since the 0th and fourth lines are specified, the order (vertical relationship) of all the lines can be consequently specified.

The above description applies to all n-valued color images.

The fourth embodiment will be described below. This embodiment uses the above-mentioned adding method of additional information. This embodiment is characterized by comprising an addition status discrimination unit having a function of discriminating possibility of addition of additional information or addition status in a series of systems for performing image processing of color image data to be generated.

FIG. 14 is a diagram for explaining a printer (color laser beam printer) and host computer as external equipment used in this embodiment.

The host computer 100 frame-sequentially transmits color image data (code data described in a predetermined description language) consisting of Y, M, C, and K color components to the image processing unit 102 in units of pages.

The image processing unit 102 maps the frame-sequentially input color image data into that for printing by interpreting the description language, and then executes predetermined color image processing for the mapped data to output frame-sequential Y, M, C, and K color image data to the image forming unit 101.

The image forming unit 101 picture-sequentially prints the input color image data.

The flow of processing from when color image data is generated until the data is output onto a recording medium as a visible image will be explained below.

At the host computer 100, the user creates color image data. Such image creation is implemented using an image edit application program or the like. Note that the color image data may be the one obtained by downloading data via the Internet in place of the data created by the user or the one input from a photographing equipment, such as a digital camera or the like, into the host computer 100.

The color image data input in this manner is transmitted to the image processing unit 102 of the printer. Before transmission, it is discriminated whether or not each of the image processing unit 102 and image forming unit 101 can add additional information to the color image data to be transmitted, and how they execute addition if they can.

If it is determined as a result of this discrimination that one of the image processing unit 102 and image forming unit 101 "can add additional information to the color image data to be transmitted and is going to execute addition if it can", the host computer 100 directly transmits the color image data to the image processing unit 102.

On the other hand, if neither of the two units "can add additional information to the color image data to be transmitted and are going to execute addition if they can", the host computer 100 adds additional information to the color image data, and then transmits the data to the image processing unit 102. Assume that the host computer 100 has the function of adding additional information in this case.

Upon reception of the color image data from the host computer 100, the image processing unit 102 maps this color image data (code data), and performs predetermined image processing. After that, the unit 102 executes the following discrimination.

The image processing unit 102 checks if additional information has already been added to the input color image data. This discrimination may be attained by receiving control data from the host computer 100 or may be made based on actual color image data.

Furthermore, the image processing unit 102 discriminates if the subsequent image forming unit 101 can add additional information to the color image data to be transmitted, and is going to execute addition if it can.

If the image processing unit 102 determines as a result of this discrimination that additional information has already been added to the input color image data" or the subsequent image forming unit 101 "can add additional information to the color image data to be transmitted, and is going to execute addition if it can", it directly transmits the color image data to the image forming unit 101.

On the other hand, if the image processing unit 102 determines as a result of the discrimination that "no additional information is added to the input color image data, and the subsequent image forming unit 101 cannot add additional information to the color image data to be transmitted or is not going to execute addition although it can", the unit 102 adds additional information to the color image data to be transmitted, and transmits that data to the image forming unit 101.

Upon receiving the color image data from the image processing unit 102, the image forming unit 101 makes the following discrimination before it outputs the color image data onto a recording medium as a visible image.

That is, the image forming unit 101 discriminates if additional information has already been added to the input color image data by the host computer 100 or image processing unit 102. This discrimination may be attained by receiving control data from the host computer 100 and image processing unit 102, or may be made based on actual color image data.

If it is determined that additional information has already been added to the input color image data, this color image data is directly output as a visible image.

On the other hand, if it is determined that additional information has not been added to the input color image data yet, the image forming unit 101 adds additional information to that color image data, and then outputs the image data as a visible image.

Note that the individual equipments may use identical or different additional information in this embodiment. However, as the additional information to be added by the host computer 100, the Internet address, user ID of the computer, the application name, the version of the application, the creator's name upon creating an image, and the like are preferably added. As the additional information be added by the image processing unit 102, the ID of the manufacturer who manufactured the image processing unit 102, model number, and machine number are preferably added. Also, as the additional information to be added by the image forming unit 101, the ID of the manufacturer who manufactured the image forming unit 101, model number, and machine number are preferably added.

When the individual equipments add different additional information, whether or not the own equipment adds additional information need not always be determined in reference to whether another equipment adds or has added additional information.

For example, when the host computer 100 has already added the additional information, the subsequent equipments may also add additional information as long as the already added information (dot pattern) can be decoded.

Not all the discrimination conditions for determining whether or not the own equipment adds additional information need be satisfied. For example, the image forming unit 101 may discriminate "if one of the host computer 100 and image processing unit 102 has the function of adding additional information" in place of discriminating if "one of the host computer 100 and image processing unit 102 has already added additional information". That is, the scope of the present invention also includes a case wherein it is not checked if additional information is reliably added.

The fifth embodiment will be described below. This embodiment uses the above-mentioned adding method of additional information. This embodiment is characterized in that a printer and a plurality of host computers each having the addition status discrimination unit described in the fourth embodiment are connected to a network capable of connecting a large number of equipments, and the addition status discrimination unit discriminates possibility of addition of additional information or addition status in a series of systems that perform image processing of color image data to be generated and include the printer and host computers connected to the network.

FIG. 15 shows the state wherein the printer (mainly, color laser beam printer) and a plurality of host computers as external equipments used in this embodiment are connected to the network and used. A host interface unit 1 (see FIG. 3) in the image processing unit 102 is connected to a LAN bus 90 via an inter-host communication line 2 (in this embodiment, a LAN interface 91 (for example, an Ethernet interface such as 10base-2, 10base-T, or 10base-5 connected to a coaxial connector, RJ45 connector, or DB15 connector (AUI)).

Host computers #1 (1000), #2 (1001), and #3 (1002) corresponding to the above-mentioned host computer 100 are connected to the LAN bus 90.

The host computers 1000, 1001, and 1002 respectively frame-sequentially transmit color image data (code data described in a predetermined description language) each consisting of Y, M, C, and K color components to the image processing unit 102 of the printer via the network in units of pages.

The image processing unit 102 maps the frame-sequentially input color image data into that for printing by interpreting the description language, and then executes predetermined color image processing for the mapped data to output frame-sequential Y, M, C, and K color image data to the image forming unit 101.

The image forming unit 101 frame-sequentially prints the input color image data.

The flow of processing from when color image data is generated until the data is output onto a recording medium as a visible image will be explained below.

At one of the host computers 1000, 1001, and 1002, the user creates color image data. Such image creation is implemented using an image edit application program or the like. Note that the color image data may be the one obtained by downloading data via the Internet in place of the data created by the user or the one input from a photographing equipment, such as a digital camera or the like, into the host computer 100.

The color image data input in this manner is transmitted to the image processing unit 102 of the printer via the network. Before transmission, it is discriminated whether or not each of the image processing unit 102 and image forming unit 101 can add additional information to the color image data to be transmitted, and how they execute addition if they can. This discrimination is made by the addition status discrimination unit in each host computer.

If it is determined as a result of this discrimination that at least one of the image processing unit 102 and image forming unit 101 "can add additional information to the color image data to be transmitted and is going to execute addition if it can", the host computer (one of 1000, 1001, and 1002) which transmits the color image data to this printer directly transmits the color image data to the image processing unit 102 via the network. That is, the host computer transmits the color image data to the printer without adding any additional information.

On the other hand, if neither of the two units in the printer "can add additional information to the color image data to be transmitted and are going to execute addition if they can", the host computer that transmits the color image data to the printer adds additional information to the color image data, and then transmits the data to the image processing unit 102 via the network. Assume that each host computer that transmits color image data has the function of adding additional information in this description. However, if the host computer does not have the adding function, the printer adds additional information to the color image data.

Upon reception of the color image data from the host computer, the image processing unit 102 maps this color image data (code data), and performs predetermined image processing. After that, the unit 102 executes the following discrimination.

The image processing unit 102 checks if additional information has already been added to the input color image data. This discrimination may be attained by receiving control data from the host computer via the network or by analyzing the contents of the input color image data.

Furthermore, the image processing unit 102 discriminates if the subsequent image forming unit 101 can add additional information to the color image data to be transmitted, and is going to execute addition if it can.

If the image processing unit 102 determines as a result of this discrimination that the additional information has already been added to the input color image data" or the subsequent image forming unit 101 "can add additional information to the color image data to be transmitted, and is going to execute addition if it can", it directly transmits the color image data to the image forming unit 101. That is, the image processing unit 102 does not add any additional information to the color image data.

On the other hand, if the image processing unit 102 determines as a result of the discrimination that "no additional information is added to the input color image data, and the subsequent image forming unit 101 cannot add additional information to the color image data to be transmitted or is not going to execute addition although it can", the unit 102 adds additional information to the color image data, and transmits that data to the image forming unit 101.

Upon receiving the color image data from the image processing unit 102, the image forming unit 101 makes the following discrimination before it outputs the color image data onto a recording medium as a visible image. That is, the image forming unit 101 discriminates if additional information has already been added to the input color image data by the host computer (one of 1000, 1001, and 1002) that transmitted the color image data or image processing unit 102. This discrimination may be attained by receiving control data from the host computer and image processing unit 102, or by analyzing the contents of the input color image data. Note that the control data is received from the host computer via the network LAN interface 91.

If it is determined that the additional information has already been added to the input color image data, this color image data is directly output as a visible image.

On the other hand, if it is determined that additional information has not been added to the input color image data yet, the image forming unit 101 adds additional information to that color image data, and then outputs the image data as a visible image.

Note that the individual equipments (the host printers or printer) may use identical or different additional information in this embodiment according to purposes. However, as the additional information to be added by the host computer (1000, 1001, and 1002), the Internet address, user ID of the computer, the application name, the version of the application, the creator's name upon creating an image, and the like are preferably added. As the additional information be added by the image processing unit 102, the ID of the manufacturer who manufactured the image processing unit 102, model number, and machine number are preferably added. Also, as the additional information to be added by the image forming unit 101, the ID of the manufacturer who manufactured the image forming unit 101, model number, and machine number are preferably added.

When the individual equipments add different additional information, whether or not the own equipment adds additional information need not always be determined in reference to whether another equipment adds or has added additional information.

For example, when the host computer (one of 1000, 1001, and 1002) has already added the additional information, the subsequent equipments may also add additional information as long as the already added information (dot pattern) can be decoded.

Not all the discrimination conditions for determining whether or not the own equipment adds additional information need be satisfied. For example, the image forming unit 101 may discriminate "if one of the host computers and image processing unit 102 has the function of adding additional information" in place of discriminating if "one of the host computers and image processing unit 102 has already added additional information". That is, only the presence/absence of the adding function of additional information in other equipments may be discriminated, and whether or not each equipment actually add information need not be discriminated. Note that such discrimination conditions may be appropriately changed or added in correspondence with purposes.

Note that the present invention may be applied to either part of a system constituted by a plurality of equipments (e.g., a host computer, interface device, reader, printer, and the like), or part of an apparatus consisting of a single equipment (e.g., a copying machine, a facsimile apparatus, or the like).

The present invention is not limited to only the apparatus and method of realizing the above embodiments, but may be applied to a case wherein the embodiments are realized in such a manner that a program code of software for realizing the above embodiments is supplied to a computer (CPU or MPU) in the system or apparatus, and the computer in the system or apparatus controls to operate various devices described above.

In this case, the program code itself of software realizes the functions of the above-mentioned embodiments, and the program code itself, and means for supplying the program code to the computer (more specifically, a storage medium which stores the program code) are included in the scope of the present invention.

As the storage medium for storing the program code, for example, a floppy disk, hard disk, optical disk, magneto-optical disk, CD-ROM, magnetic tape, nonvolatile memory card, ROM, and the like may be used.

Not only when the functions of the embodiments are realized by controlling various devices by the computer according to only the supplied program code but also when the program code realizes the embodiments in cooperation with an OS (operating system) running on the computer or another application software, such program code is included in the scope of the present invention.

Furthermore, the scope of the present invention includes a case wherein the supplied program code is stored in a memory equipped on a function extension board of the computer or a function extension unit connected to the computer, and a CPU or the like equipped on the function extension board or unit then executes some or all of actual processing operations on the basis of instructions of the program code, thereby realizing the embodiments.

To restate, according to the present invention, in a system for performing image processing of an input image, even when that system may have a plurality of equipments having an adding function of additional information, additional information can be reliably and efficiently added to the input image.

Various modifications of the present invention may be made within the scope of the appended claims.

What is claimed is:

1. An image processing apparatus comprising:
   generation means for generating image data;
   discrimination means for discriminating whether or not externally connected equipment related to the image data generated by said generation means adds predetermined additional information to be hardly discernible by the human eye;
   adding means for adding the predetermined additional information to the image data generated by said generation means to be hardly discernible by the human eye when said discrimination means discriminates that the externally connected equipment does not add the predetermined additional information; and
   output means for outputting the image data to which the predetermined additional information is added by said adding means or the image data generated by said generation means.

2. An apparatus according to claim 1, wherein said output means outputs the image data to which the predetermined additional information is added by said adding means or the image data generated by said generation means to the externally connected equipment.

3. An apparatus according to claim 1, wherein the image data generated by said generation means is received from the externally connected equipment.

4. An apparatus according to claim 1, wherein the externally connected equipment includes a plurality of units of equipment.

5. An apparatus according to claim 2, wherein said image processing apparatus comprises a host computer, and the externally connected equipment comprises a printer controller or printer engine.

6. An apparatus according to claim 3, wherein said image processing apparatus comprises a printer controller, and the externally connected equipment comprises a host computer.

7. An apparatus according to claim 2, wherein said image processing apparatus comprises a printer controller, and the externally connected equipment comprises a printer engine.

8. An apparatus according to claim 3, wherein said image processing apparatus comprises a printer engine, and the externally connected equipment comprises a host computer or printer controller.

9. An apparatus according to claim 1, wherein the image data is color image data consisting of a plurality of color components, and said adding means adds the predetermined additional information to not all the plurality of color components but at least some color components.

10. An apparatus according to claim 1, further comprising:
    visible output means for outputting the image data output from said output means onto a predetermined recording medium as a visible image.

11. An apparatus according to claim 1, wherein the image data is code data described in a predetermined description language, and said apparatus further comprises mapping means for mapping the code data into image data by interpreting the code data.

12. An apparatus according to claim 1, wherein said discrimination means discriminates whether or not the externally connected equipment has the function of adding predetermined additional information to be hardly discernible by the human eye, and also discriminates if the externally connected equipment adds the predetermined additional information to the image data.

13. An apparatus according to claim 1, wherein said adding means adds the predetermined additional information as a dot pattern consisting of a plurality of dots.

14. An apparatus according to claim 13, wherein the predetermined additional information is expressed by a phase difference between the plurality of dots.

15. An apparatus according to claim 13, wherein each of the plurality of dots is defined by an area in which an image density is raised by a predetermined value, and an area in which the image density is dropped by a predetermined value.

16. An apparatus according to claim 13, wherein said adding means controls to substantially preserve density before and after the dot pattern is added.

17. An apparatus according to claim 1, wherein the predetermined additional information is one of an Internet address, user ID, application name, and version of an application associated with said image processing apparatus.

18. An apparatus according to claim 1, wherein the predetermined additional information is a name of a creator who created the image data.

19. An apparatus according to claim 1, wherein the predetermined additional information includes an ID of a manufacturer who manufactured said image processing apparatus, model number, and machine number.

20. An image processing method comprising:

a generation step, of generating image data;

a discrimination step, of discriminating whether or not externally connected equipment related to the image data generated in the generation step adds predetermined additional information to be hardly discernible by the human eye;

an adding step, of adding the predetermined additional information to the image data generated in the generation step to be hardly discernible by the human eye when it is discriminated in said discrimination step that the externally connected equipment does not add the predetermined additional information; and an output step, of outputting the image data to which the predetermined additional information is added in the adding step or the image data generated in the generation step.

21. A storage medium which computer-readably stores an image processing program, said image processing program comprising:

a generation step, of generating image data;

a discrimination step, of discriminating whether or not externally connected equipment related to the image data generated in the generation step adds predetermined additional information to be hardly discernible by the human eye;

an adding step, of adding the predetermined additional information to the image data generated in the generation step to be hardly discernible by the human eye when it is discriminated in said discrimination step that the externally connected equipment does not add the predetermined additional information; and an output step, of outputting the image data to which the predetermined additional information is added in the adding step or the image data generated in the generation step.

* * * * *